Aug. 15, 1950  I. A. GREENWOOD, JR., ET AL  2,519,043

MOTOR ENERGIZATION CIRCUIT

Filed Aug. 10, 1948

Inventors
IVAN A. GREENWOOD
EVERETT B. HALES

By H. A. Mache

Patented Aug. 15, 1950

2,519,043

UNITED STATES PATENT OFFICE 2,519,043

MOTOR ENERGIZATION CIRCUIT

Ivan A. Greenwood, Jr., Pleasantville, and Everett B. Hales, Mount Kisco, N. Y., assignors to General Precision Laboratory Incorporated, a corporation of New York Application August 10, 1948, Serial No. 43,504

9 Claims. (Cl. 318—212)

1

This invention relates to a motor energization circuit particularly applicable to servo control circuits.

In electrical servo control systems it is generally the practice to provide an amplifier whose input comprises an electrical quantity representative of the difference between a control signal and an electrical quantity representative of the position or velocity of the load which is to be controlled. The difference between these two quantities is termed the error signal and this signal after being amplified by the amplifier varies the energization of one coil of a two phase motor to control its direction, speed and amount of rotation. The motor in turn operates a suitable load through desired gearing and also acts to vary the electrical quantity representative of the actuation of the load. When, therefore, the load is properly operated in accordance with the control there is a zero error signal and hence zero output so that no rotation of the motor is obtained. If such balance is not had, however, the error signal after amplification constitutes the means which causes rotation of the motor.

When the error is small the power applied to the motor is frequently insufficient to do more than rotate the motor to overcome what backlash may exist in the gearing and is insufficient to overcome the friction of the various bearings and gearing to produce an actuation of the load. There is then a disagreement between the proper actuation of the load and the control. When the error becomes somewhat greater the power supplied becomes sufficient to overcome the friction causing the load to be actuated and since some inertia necessarily exists in the motor, there is a tendency for it to be actuated to too great an extent. This will result in an error signal of opposite sign which if sufficient to overcome the friction as well as the backlash of the gears produces an undesired hunting effect. At the least the motor rotates to too great an extent, is then stopped because the power is insufficient to overcome the friction of the various bearings and does not restart until the error signal again becomes such that friction can be overcome. This results in a hesitant or jerky movement of the load even though the control signal is being varied at a uniform rate. The purpose of the present invention is to so energize the motor that whenever any error signal is developed there are superimposed on the torque produced by the error signal additional torque pulses which are sufficient to take up the backlash of the gearing and overcome the friction in either direction of operation of the motor in rapidly recurring increments so that smooth and continuous operation of the motor and load is obtained at all times.

Additionally the instant invention provides means whereby a damping action in the nature of viscous damping acts on the motor at all times and thus prevents an excessive increase in velocity while the motor is operating merely to take up the backlash in the gearing.

Specifically such energization is attained by energizing the coil of the motor which is not under control of the amplified error signal by a direct current as well as the usual phase shifted alternating current.

The exact nature of the invention will be more clearly understood from a consideration of the following description taken together with attached drawings, in which.

Figure 1:
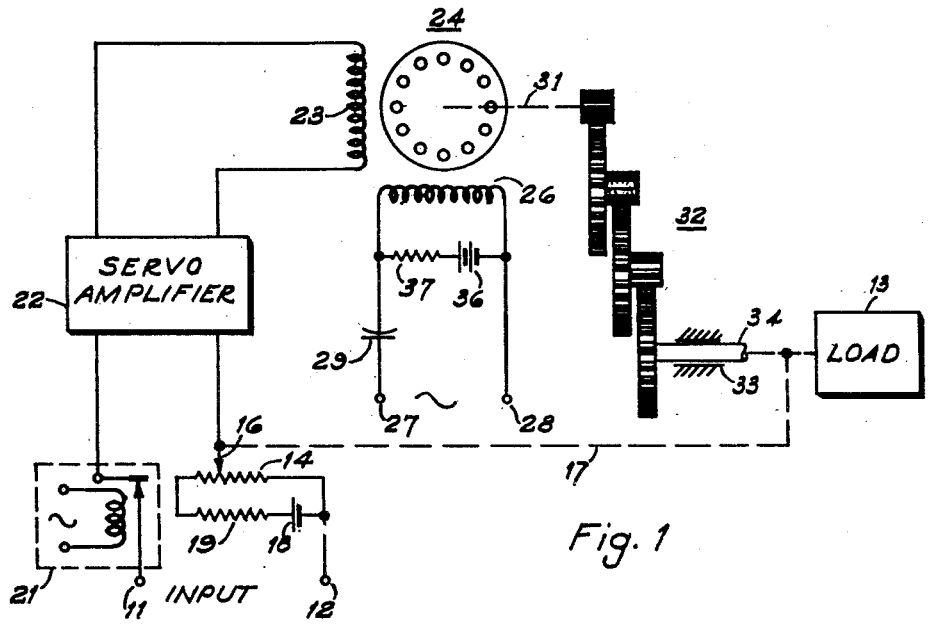
Figure 1 is a diagrammatic representation of the circuit of the invention.

Referring now to Fig. 1 of the drawing, the signal which is to function as the control means and which may be derived from any suitable source such as a thermocouple, manual control, photocell or the like is impressed on the input terminals 11, 12. This signal is balanced against a signal which is proportional to the actuation of the load 13 by the use of a potentiometer 14 whose movable contact 16 is positioned by a shaft indicated by the dotted line 17 actuated in accordance with the movement of the load. A source of potential indicated diagrammatically as a battery 18 and limiting resistor 19 supplies a potential to the potentiometer 14 which opposes the potential of the input signal supplied to terminals 11 and 12 so that when the load has been properly positioned in accordance with the input signal, the potential supplied by the potentiometer is exactly equal and opposite to the input signal and their difference or error signal is zero.

If these signals are direct current potentials they are converted to an alternating current signal by means of an interrupter or chopper 21 before being applied to the input terminals of a servo amplifier 22. If, however, the control signal is an alternating current signal, the potential applied across the potentiometer 14 is also made to be an alternating potential of the opposite phase by use of a proper potential source in place of the battery 18 and in this case the interrupter 21 is not needed. Likewise other equivalent instrumentalities may be used rather than the potentiometer 14.

The error signal if any, is impressed on the input of the servo amplifier 22, amplified thereby and the output used to energize one coil 23 of a two phase motor 24. The other coil 26 is energized by the alternating current line indicated diagrammatically by the terminals 27 and 28 and the phase of this alternating current is shifted substantially 90 degrees with respect to phase of the potential of the coil 23 by the inclusion of a condenser 29 in circuit with the coil 26.

When an error signal is impressed on the input of the servo amplifier 22, amplified thereby thus energizing the coil 23 a torque is developed in the motor 24 which causes it to rotate in one direction or the other in accordance with the sense of the error signal. This torque is transmitted through the motor shaft 31, gears 32 to the shaft 34 which is turned against the friction of the necessary supporting bearings indicated diagrammatically at 33 to rotate a desired load 13.

When, however, the error signal is small, the torque applied to the motor 24 is also small and it may be only sufficient to take up the backlash in the gearing 32 but insufficient to overcome the friction of the bearings 33. The load 13 and also the potentiometer contact 16 is not moved so that this small error signal continues to be impressed on the system. If, now, the error signal is increased slightly by an increase in the control potential applied to the terminals 11 and 12, the torque becomes sufficient to overcome the friction of the bearings 33 and the load is actuated but an excessive amount of torque in comparison to the amount required is applied to the load causing it to overrun and the movable contact 16 to be moved to such an extent as to produce an error signal in the opposite direction.

This results in a reverse torque being produced at the motor 24 which causes it to rotate in the opposite direction, which in turn operates the gears 32 in the opposite direction until their backlash is again taken up and the shaft 34 is held against rotation by the friction of the bearings 33.

The load will not be started in its proper direction until the signal introduced at the terminals 11 and 12 has increased to such a value that a new error signal is produced which supplies enough torque to take up the backlash in the gears 32 and overcome the starting friction of the bearings 33. The result is that when a slowly increasing signal is introduced at the terminals 11 and 12, the load 13 is operated in a hesitant or interrupted fashion and does not accurately follow the increase in control signal in the desired smooth fashion.

In the instant invention the undesirable and objectionable interrupted or hesitant operation at low speeds is obviated by energizing the coil 26 from a direct current source as well as the alternating current source previously described. This direct current energization is diagrammatically illustrated as being provided by a battery 36 connected in series with a limiting resistor 37, the whole being connected in shunt to the coil 26. It will, of course, be understood by one skilled in the art that other sources of direct current such as a rectified filtered source may be used with equal efficacy if available, and this is usually the case since the servo amplifier is ordinarily in large measure powered by such a source.

The direct current energization as it is applied in the present invention has two essential functions, both of which are of considerable aid in providing a smooth uniform actuation of the load 13 in accordance with the control signal applied to the input of the system.

When there is no error signal and hence no energization of the coil 23, neither the direct current energization nor the alternating current energization of the coil 26 applies any torque to the motor 24 so that it is perfectly quiet. However, when the coil 23 is energized by an alternating current, the alternating current energization of coil 26 displaced substantially 90 degrees in phase from that of coil 23, as mentioned heretofore, produces a torque tending to rotate the motor in one direction or the other depending on the sense of energization of the coil 23. At the same time the steady field produced by the direct current derived from the source 36 and superimposed on the alternating current in coil 26, reacts with the alternating field produced by the coil 23 and produces an added proportional vibrating or superimposed pulses of torque on the motor. That is to say, this interaction of the alternating current energization of the coil 23 and the direct current energization of the coil 26 tends to cause the motor to rotate in first one direction and then the other at the frequency of the alternating current in the coil 23. In other words, the motor tends to dither.

This oscillatory or dithering action is sufficient to take up the backlash in the gearing and added to the constant torque produced by the alternating current energization of the coil 26 overcomes the friction of the bearings at even the lowest error signals so that smooth actuation of the load is attained and the hesitant action referred to above is avoided. Indeed this vibration is not apparent when the motor is following smoothly but comes into play whenever resistance is encountered as the friction referred to, high spots in the gearing or the like.

At the same time the direct current excitation constitutes a damping means in the nature of viscous damping on the motor itself and reduces the speed of the motor at low error signals although it has little effect on the maximum speed of the motor at the maximum error signals. This action may be better visualized by reference to the curves of Fig. 2 wherein curve 41 illustrates the relation between the speed of the motor and the voltage applied to the controlling coil 23 when no direct current is applied to the alternating current line excited coil 26. Curve 42 illustrates the same relationship when the line excited coil 26 has superimposed thereon a direct current of approximately half that of the alternating current therethrough and curve 43 the relationship between speed and control voltage when the direct current is approximately equal to the alternating current through the line excited coil 26.

Because the speed of the motor is reduced at the lower error signals and because the speed increases in a more nearly linear relation with increase in error signals, the tendency for the motor and hence load to overrun is greatly reduced so that the invention effects a damping or antihunt action.

Figure 2:
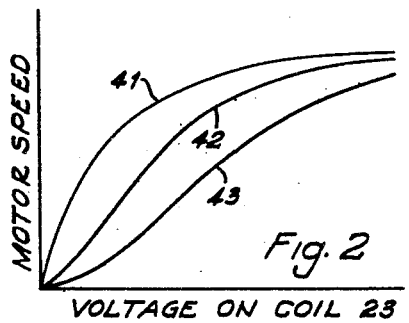
Figure 2 illustrates by means of characteristic curves some of the results achieved by the use of the invention.

The value of the direct current applied to the line excited coil is not critical as can be ascertained from the curves of Fig. 2. This current should be introduced in the line excited coil as shown rather than the controlling coil 23, however, since if introduced in the controlling coil a continuous vibratory action of rather large amplitude is obtained which does not provide the smooth functioning action of the invention described and is likely to produce excessive wear on the gearing and associated mechanisms.

Instead of the use of a separate direct current supply for the coil energized from the alternating current source of fixed amplitude similar results may be attained by rectifying at least a portion of the alternating current applied to this coil.

Figure 3:
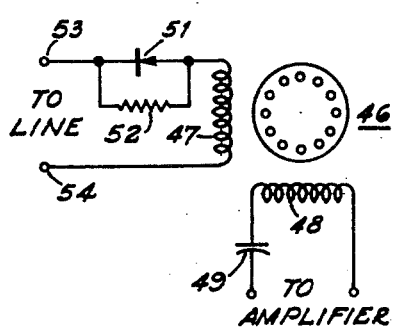
Figure 3 is a schematic diagram of a modified portion of the circuit of Fig. 1.

Such an arrangement is illustrated in the partial circuit of Fig. 3. In this form of the arrangement the amplified error voltage is impressed on the coil 48 of the motor 46 and its phase is shifted by the inclusion of the condenser 49 in the circuit.

The other coil 47 for the motor 46 is energized from a source of constant amplitude alternating current such as a standard 110 volt line through a circuit which consists of a rectifier 51, which may be of the contact type, shunted by an impedance represented by a resistor 52, although a condenser may also be utilized for the same purpose. The use of the impedance 52 is not absolutely essential but its inclusion is recommended, since in its absence the direct current component produced as a result of the rectification of the alternating current supply may be excessive as respects the alternating current component. The shunt impedance 52, therefore, by bypassing some of the alternating current energy permits a better adjustment of the relative values of these components.

The direct current component, of course, constitutes the average value of the rectified alternating current supply, while the alternating current component consists of the root mean square value of the rectified half wave pulses and the alternating current bypassed by the impedance 52 if such an element is used. The same resultant effect, that is, a superimposition of a direct current on an alternating current, is attained, therefore, as is accomplished by the circuit of Fig. 1 without necessitating the use of a separate direct current supply.

Figure 4:
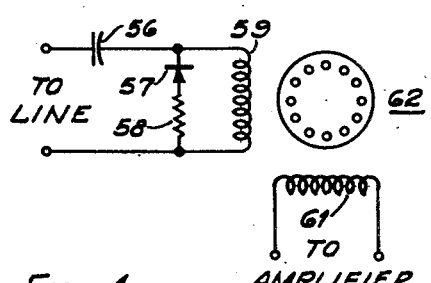
Figure 4 is a schematic diagram of a further modification of a portion of the circuit of Fig. 1.

Another manner in which the direct current supply for the line energized coil may be obtained by rectifying a portion of the alternating current supply is illustrated in Fig. 4.

In this circuit a rectifier 57 in series with a resistor 58 of some low value say 50 ohms to limit the current to the desired value is connected in shunt to the line energized coil 59. This phase of the motor may also include the phase shifting means such as the condenser 56 and consequently the controlled coil 61 is energized from the amplifier or such other controlling source as may be used without phase shift.

What is claimed is:

1. A motor energization circuit for a servo system comprising, a two phase motor, a source of alternating current of controllable variable amplitude energizing one of the coils of said motor, a source of alternating current of fixed amplitude energizing the other coil of said motor, a source of direct current energy connected to be superimposed on said alternating current of fixed amplitude and means for shifting the phase of one of said alternating currents substantially 90 electrical degrees with respect to the other of said alternating currents.

2. A motor energization circuit in accordance with claim 1 in which the means for shifting the phase of one of said alternating currents comprises a condenser.

3. A servo control system comprising, a two phase motor, a load operated thereby, an amplifier, means for impressing a control signal on the input circuit of said amplifier, means for opposing said control signal by an electrical quantity which is varied in accordance with the actuation of said load whereby an error signal is developed at the input of said amplifier, circuit means connected to the output of said amplifier for energizing one of the phases of said motor by an alternating current which is a function of said error signal, circuit means for energizing the other phase of said motor by an alternating current of substantially fixed amplitude, means for additionally energizing said second mentioned phase by a direct current, and means for shifting the phase of one of said alternating currents with respect to the other.

4. A servo control system in accordance with claim 3 in which the means for shifting the phase of one of said alternating currents comprises a condenser.

5. A motor energization circuit for a servo system comprising, a two phase motor, a source of alternating current of controllable variable amplitude energizing one phase of said motor, a source of alternating current of substantially fixed amplitude energizing the other phase of said motor, and a rectifier connected in circuit with said fixed amplitude source of alternating current and said last mentioned motor phase.

6. A motor energization circuit according to claim 5 including an impedance shunting said rectifier.

7. A motor energization circuit for a servo system comprising, a two phase motor, a source of alternating current of controllable amplitude connected to one coil of said motor, a condenser connected between said source and said coil for shifting the phase of said controllable amplitude alternating current, a source of alternating current of substantially fixed amplitude connected to the other coil of said motor and a rectifier connected in series with said substantially fixed amplitude alternating current source and said last mentioned field coil.

8. A motor energization circuit according to claim 7 including an impedance shunting said rectifier.

9. A motor energization circuit for a servo system comprising, a two phase motor, a source of alternating current of controllable amplitude connected to one field coil of said motor, a source of alternating current of substantially fixed amplitude connected to the other coil of said motor, a rectifier connected in shunt to said last mentioned coil and means for shifting the phase of one of said alternating current sources.

IVAN A. GREENWOOD, Jr.
EVERETT B. HALES.

REFERENCES CITED

The following references are of record in the file of this patent:

UNITED STATES PATENTS

| Number | Name | Date |
|---|---|---|
| 1,911,356 | Eames | May 30, 1933 |
| 2,141,056 | Watkins | Dec. 20, 1938 |
| 2,196,402 | Snyder | Apr. 9, 1940 |
| 2,206,920 | Riggs | July 9, 1940 |
| 2,304,604 | Schweitzer | Dec. 8, 1942 |
| 2,367,746 | Williams | Jan. 23, 1945 |
| 2,376,599 | Jones | May 22, 1945 |
| 2,455,610 | Schmidt | Dec. 7, 1948 |

FOREIGN PATENTS

| Number | Country | Date |
|---|---|---|
| 587,525 | Germany | Nov. 4, 1933 |